United States Patent Office 3,424,062
Patented Jan. 28, 1969

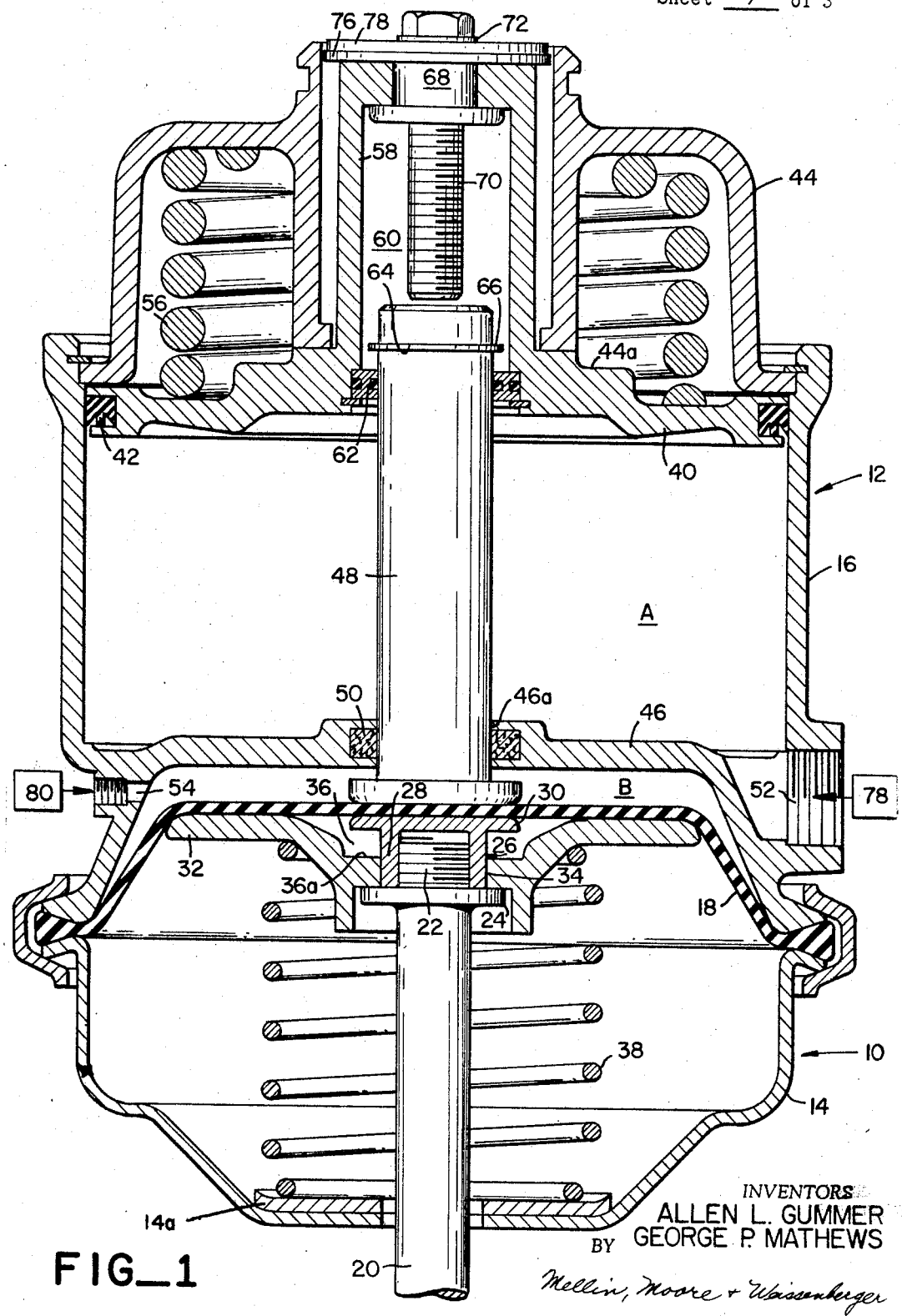

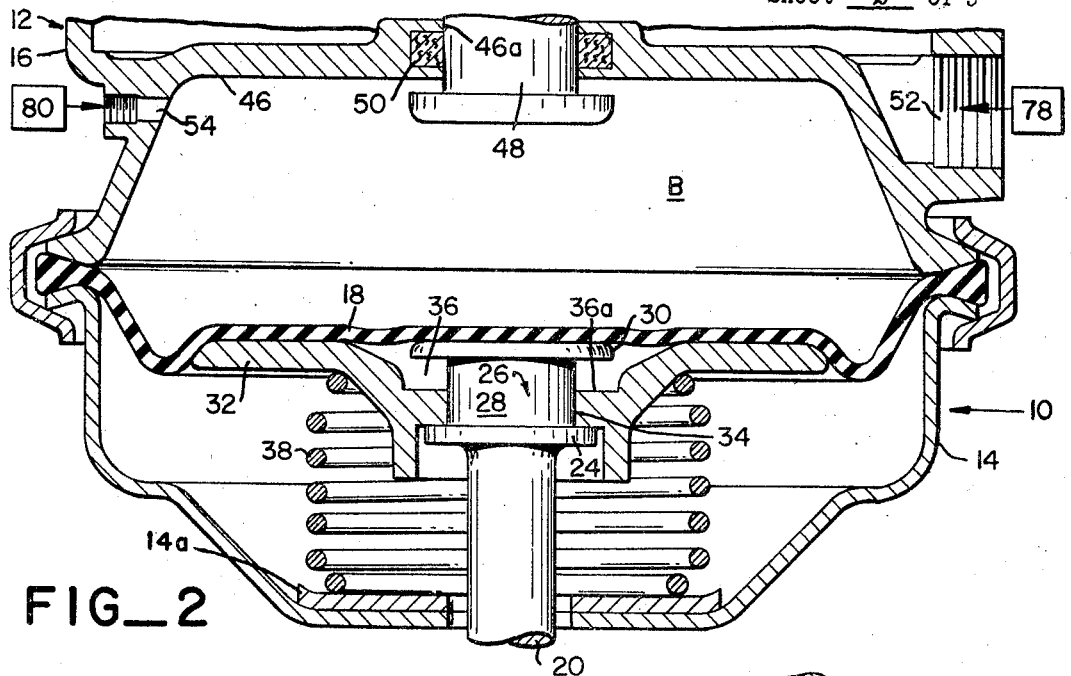
FIG_2
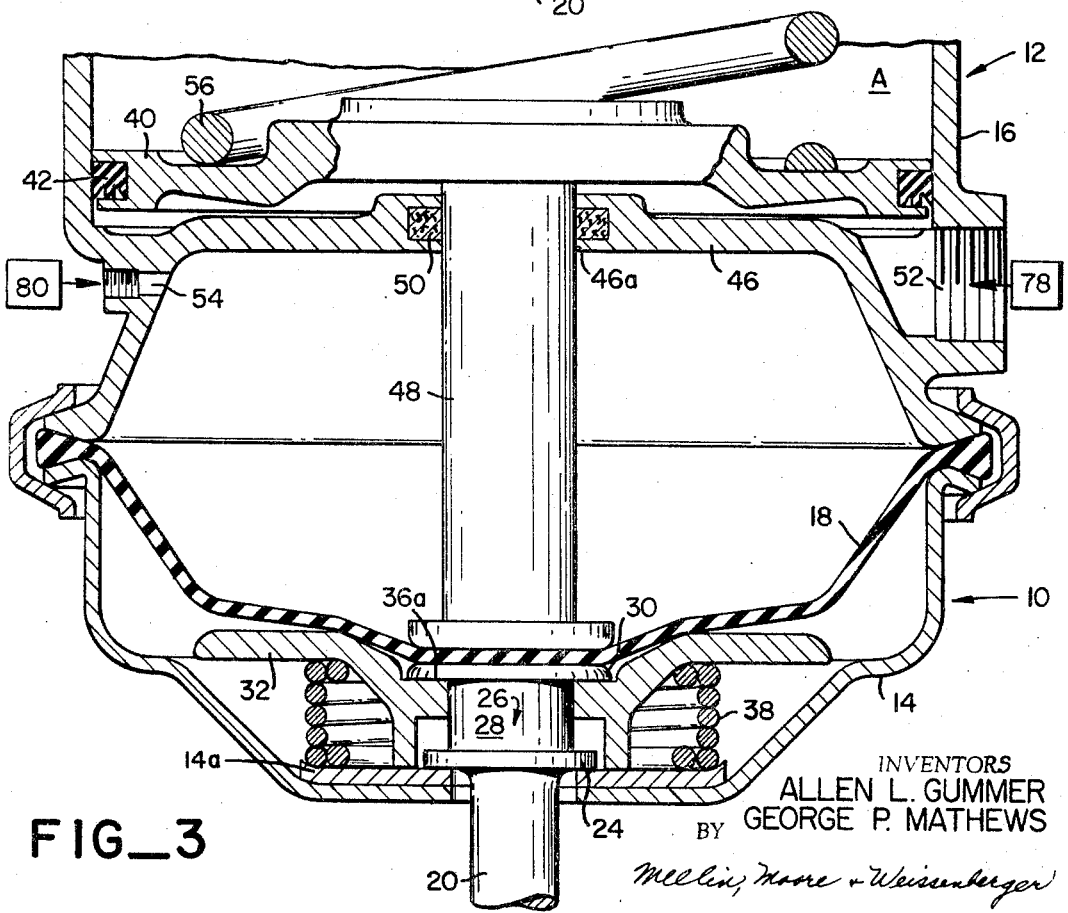
FIG_3

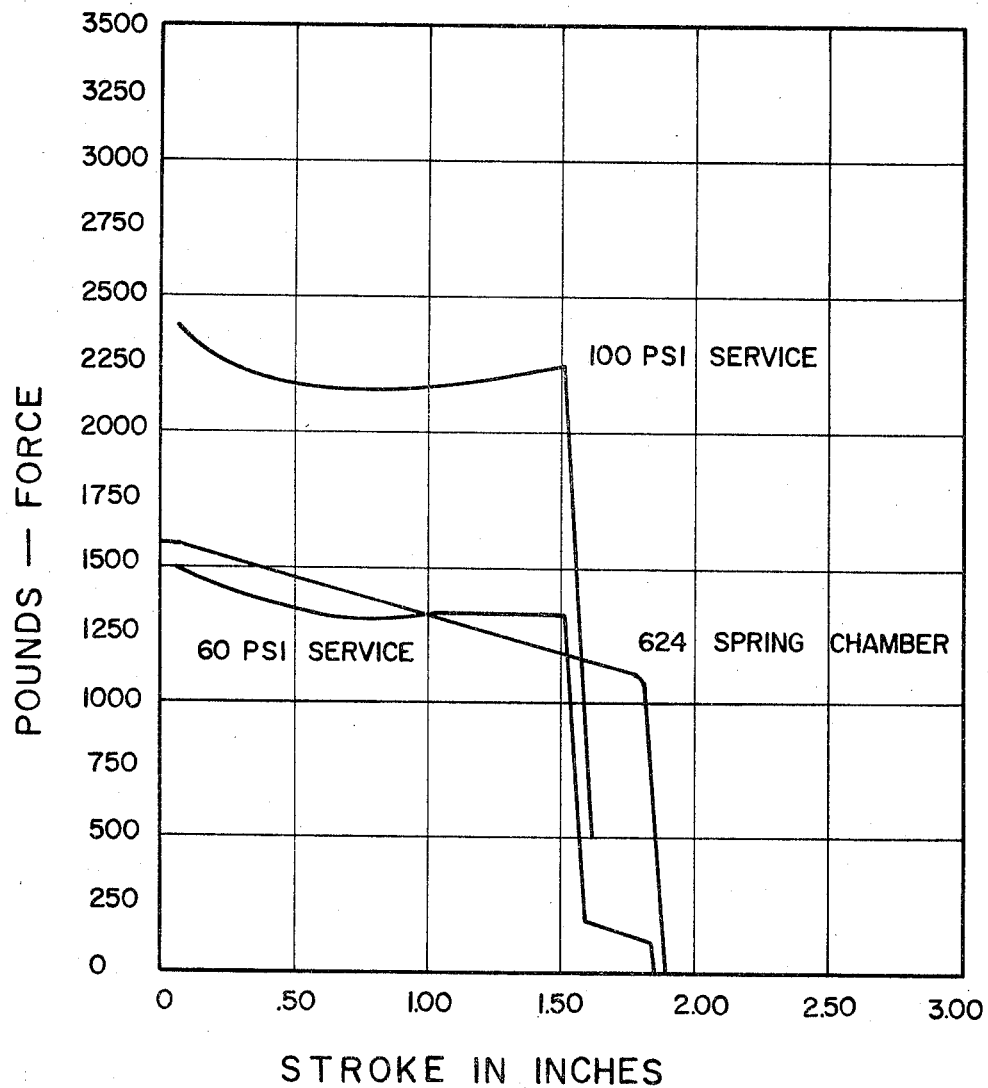
FIG_4

3,424,062
BRAKE ACTUATING MECHANISM
Allen L. Gummer and George P. Mathews, Cloverdale, Calif., assignors to MGM Brakes, Inc., Cloverdale, Calif., a corporation of California
Filed Nov. 30, 1966, Ser. No. 597,940
U.S. Cl. 92—63     8 Claims
Int. Cl. F01b 7/00, 19/02; F16j 1/10

ABSTRACT OF THE DISCLOSURE

Disclosed herein is a vehicle-braking apparatus which provides means for moving a brake-actuating rod to a point past the limit of travel obtained when the apparatus is used in the normal braking manner, thus increasing the effective stroke of the apparatus. The means is effective upon reaching the normal limit of travel of the service brake.

---

This invention relates to vehicle emergency-service braking apparatus, and more particularly to a vehicle emergency-service braking apparatus which provides an emergency brake actuating stroke which is greater than the normal service brake actuating stroke.

In the braking systems of heavy-duty vehicles, it is well known to provide an auxiliary brake-operating means which will move a brake-actuating rod to apply the brakes automatically or upon call of the vehicle operator. One common form of auxiliary brake, used when the brakes operate off a pressure source, provides a spring-loaded diaphragm which is held in compression by the main pressure source. Upon a loss of pressure or upon releasing of that pressure by the operator, the spring releases the stored energy, thereby moving the brake-actuating rod and applying the brakes.

It is a characteristic of this type of system that application of the auxiliary brake-operating means moves the brake-actuating rod no further than the limit of its movement under normal braking. Thus, while this form of auxiliary brake is useful in certain cases of brake failure (for example, failure of the pressure source), it is not useful when it would be necessary to move the brake-actuating rod further than its limit of movement under normal braking, as, for example, when the brakes are out of adjustment, or when the brake drums are heated and expanded, thus resulting in excessive clearance between the brake lining and the brake drum.

Poorly adjusted brakes are, of course, quite common, and as they become more and more out of adjustment by wear of the brake linings, the normal braking system gets closer to the limit to which it can move the brake-actuating rod. Finally, when that limit is reached, little or no braking force results when the brakes are normally applied. Similarly, little or no braking force results when the auxiliary braking system is utilized, since the auxiliary means moves the brake-actuating rod only as far as it is moved by the normal braking system.

The expansion of brake drums from heat, thereby increasing the gap between the brake shoes and drums, obviously creates the same problems.

This invention overcomes these disadvantages by providing an auxiliary brake-operating means which moves the brake-actuating rod to a point beyond the limit of normal braking travel, thereby applying braking force even when the gap between the brake lining and brake drum has grown so large that normal brake application is ineffective.

Broadly stated, the brake-actuating mechanism comprises a housing and a movable wall within the housing. A brake-actuating rod is associated with the wall and adapted to be moved thereby in a braking direction. Means are included for moving the wall in a braking direction. Means are also included for resiliently opposing movement of the wall in a braking direction and biasing the wall into a brake-releasing position. Stop means are used to limit the travel of the wall in a braking direction to thereby limit the travel of the brake-actuating rod when moved by the wall. A push rod is adapted to transmit braking movement to the brake-actuating rod. Means are included for resiliently urging the push rod in a braking direction, and means are included for moving the push rod in a brake-releasing direction, the push rod being adapted to urge and move the brake-actuating rod in a braking direction when the brake-actuating rod is at the limit of travel under ordinary braking as determined by the stop means.

In the drawings forming a part of the application and in which like parts are identified by the reference numerals throughout the same, FIG. 1 is a longitudinal center section of a preferred embodiment of braking apparatus according to the teaching of the invention.

FIG. 2 is a partial longitudinal center section of the apparatus shown in FIG. 1, but illustrating the positions of parts under normal braking.

FIG. 3 is a partial longitudinal center section of the apparatus of FIGS. 1 and 2, but illustrating the positions of the parts when the auxiliary brake-operating means are used.

FIG. 4 is a plot of travel of the brake-actuating rod against the braking force of the brake-actuating rod at any point of travel under various conditions for a particular device.

FIG. 1 shows a pneumatic braking actuator 10 and an auxiliary braking device 12, the respective bodies 14 and 16 of which sealingly hold a diaphragm 18 therebetween. A brake-actuating rod 20 is juxtaposed within the actuator body 14, and is urged by means such as a brake shoe return spring, not shown, in a brake-releasing direction and biased into a brake-releasing position. The brake-actuating rod 20 has a threaded end portion 22 and a radial flange 24 formed adjacent the threaded end portion 22. A nut 26 is threadedly secured to the threaded portion 22 of the brake-actuating rod 20, the nut 26 having a body 28 and a radial rib 30 formed thereon which is positioned so that when the nut 26 is fully tightened down on the brake-actuating rod 20, the nut body 28 is in contact with a portion of the radial flange 24 and a gap exists between the radial flange 24 and the radial rib 30.

A substantially disclike piston 32 is disposed about the nut body 28, the nut body 28 passing through a central aperture 34 in the piston 32. The nut body 28 is slidable in the aperture 34 within the piston 32 and is limited in movement in one direction by the radial flange 24 contacting the piston 32 and in the other direction by the radial rib 30 contacting the piston 32.

The piston 32 has a recess 36 which includes a seat 36a about the aperture 34 located where the piston 32 is contacted by the radial rib 30. Thus the radial rib 30 is is seatable in the seat 36a. That portion of the upper surface of the piston 32 between its outer periphery and the recess 36, and the upper surface of radial rib 30 of nut 26, are positioned to contact the diaphragm 18 and be urged thereby in a braking direction. However, the piston 32 has a much larger area in contact with the diaphragm 18 than does the upper surface of the radial rib 30 of nut 26.

A helical spring 38 is disposed between the piston 32 and the actuator body 14, the spring 38 urging against that surface of the piston 32 opposite the surface which bears against the diaphragm 18. The parts are thus arranged so that air pressure against the diaphragm 18 will urge the piston 32 which in turn urges the radial flange 24 of the brake-actuating rod 20 in a brake-operating direction. The helical spring 38 opposes movement of the piston 32 and diaphragm 18 in a braking direction and biases the piston 32 and diaphragm 18 in a brake-releasing position. The travel of the piston 32 in a braking direction is limited by the piston 32 contacting either the end wall of the actuator body 14 or an end wall reinforcing plate 14a.

The auxiliary brake-operating device 12 defines an expansible chamber A comprising a body 16 within which is a movable wall 40. The wall 40 has a peripheral sealing element 42 which engages the inner surface of the body 16. Body 16 has attached a cover plate 44 and includes an end wall 46 which forms an expansible chamber B with the diaphragm 18. The end wall 46 is a barrier between the chambers A and B and defines an opening 46a that receives a push rod 48. Actuator body 14 and end wall 46 thus form a first housing, and body 16, end wall 46, and cover plate 44 thus form a second housing. A sealing means 50 is disposed intermediate push rod 48 and the opening 46a for pressure-sealing each chamber. Threaded conduit means 52 and 54 are provided for transmitting fluid pressure into the chambers A and B respectively. It will be noted that a compression spring 56 is disposed between wall 40 and cover plate 44 for urging wall 40 in a brake-applying direction. The wall 40 includes a central sleeve portion 58 having an inner recess 60 for receiving the push rod 48. A sealing means 62 disposed within the sleeve portion 58 receives the push rod 48 in a sliding fit allowing reciprocal movement of the push rod 48 relative to the wall 40. It will be noted that push rod 48 is formed with a groove 64 having a retaining clip 66 for limiting the relative free slidable movement of the rod 48 in the direction of the diaphragm 18. An internally threaded bushing 68 is cast within the sleeve portion 58 and a threaded bolt 70 is retractably mated therewith. Also, a lock washer 72, a flat washer 74, and a flat nylon disc 76 are disposed between the end of the sleeve 58 and the head of the bolt 70. The push rod 48 is thus adapted to be urged by the bolt 70 moving along with the wall 40 under the pressure of the spring 56 into contact with the diaphragm 18.

In operation, threaded conduit means 52 and 54 are connected to a primary pressure source 78 and a valve-controlled pressure line 80. Under normal conditions, i.e., without braking of the vehicle, the parts will be arranged as in FIG. 1. Pressure in chamber A will move the wall 40 against the force of the spring 56 until the wall 40 contacts the stop surface 44a. Since relatively little or no pressure is passed into chamber B, the spring 38, and the means which urge the brake-actuating rod 20 in a brake-releasing direction, moves the piston 32, diaphragm 18, and brake-actuating rod 20 to a brake-releasing position, with the radial flange 24 against the piston 32.

It will also be apparent that the brakes may be actuated by applying pressure through line 80 into chamber B. This state is shown in FIG. 2 where the pressure has moved the diaphragm 18 against the piston 32, and the surface portion of the piston 32 bearing on the radial flange 24 in turn moves the brake-actuating rod 20, thereby applying the brakes. When the brakes are released, the parts will return to the positions shown in FIG. 1, as explained above.

Assuming now that the gap between the brake lining and brake drum has become excessive through wear or heat, a condition exists where, under normal braking, piston 32 bottoms on the reinforcing plate 14a, and little force is applied to the brake-actuating rod 20 by the pressure on the diaphragm 18. This is so because only that force which is applied to the nut 26 by the diaphragm 18 is urging the brake-operating rod 20 further. Thus under normal operation the brakes are ineffective.

FIG. 3 shows the auxiliary brake-operating device 12 in operation. Piston 32 is bottomed out against reinforcing plate 14a. The pressure holding the wall 40 against the spring 56 has been released and the wall 40 has been moved thereby in a brake-actuating direction. The bolt 70, moving along with the wall 40, has urged the push rod 48 against the diaphragm 18 to apply the full force of the spring 56 against the nut 26, thereby moving the brake-actuating rod 20 into recess 36 so the radial rib 30 seats on seat 36a. Thus rod 20 moves further than piston 32 under normal brake application, and with a relatively greater force.

FIG. 4 is a plot of the travel of the brake-actuating rod against the braking force of the brake-actuating rod at any point of travel for a particular device. In the apparatus tested, the brake-actuating rod is moved by the piston 1.50 inches before the piston 32 is bottomed. It will be seen that in both cases (application of 60 p.s.i. to the diaphragm and application of 100 p.s.i. to the diaphragm) the brake-actuating rod travels slightly further than 1.50 inches, but with a very small braking force beyond 1.50 inches of travel. The auxiliary braking system, however, applies a substantial force to the brake-actuating rod until it has traveled about 1.80 inches.

It is to be understood that the form of the invention herewith shown and described is to be taken as a preferred example thereof and that various changes may be made in the shape, size and arrangement of certain parts without departing from the spirit of the invention or the scope of the attached claims, and each of such changes is contemplated.

We claim:
1. A brake-actuating mechanism comprising:
 (a) a housing;
 (b) a movable wall within the housing;
 (c) a brake-actuating rod relatively movable with respect to said wall and adapted to be moved thereby in a braking direction;
 (d) means for moving the wall in a braking direction;
 (e) means for resiliently opposing movement of the wall in a braking direction and biasing the wall into a brake-releasing position;
 (f) stop means for limiting the travel of the wall in a braking direction to limit the travel of the brake-actuating rod when moved by the wall;
 (g) a push rod adapted to transmit braking movement to the brake-actuating rod;
 (h) means for resiliently urging the push rod in a braking direction, and
 (i) means for moving the push rod in a brake-releasing direction, the push rod being adapted to urge and move the brake-actuating rod in a braking direction when the movable wall is at the limit of travel determined by the stop means.

2. A brake-actuating mechanism according to claim 1 wherein the brake-actuating rod moves through an aperture in the movable wall.

3. A brake-actuating mechanism according to claim 1 wherein the push rod moves through an aperture in the movable wall to move the brake-actuating rod.

4. A brake-actuating mechanism according to claim 1 wherein force is transmitted from the push rod to the brake-actuating rod through a flexible wall member.

5. A brake-actuating mechanism comprising:
 (a) a housing;
 (b) a brake-actuating rod juxtaposed within the housing and movable in a braking direction, said brake-actuating rod having a radial flange formed thereon;
 (c) a substantially disclike movable piston having an aperture therein and a recessed portion surrounding the aperture, said rod being relatively movable with respect to said piston, the surface of the piston adjacent the aperture and opposite the recessed portion being adapted to contact the radial flange and move the brake-actuating rod in a braking direction;
 (d) a movable diaphragm secured about its edge within and by the housing and adapted to contact the surface portion of the piston adjacent the outer periphery of the piston and move the piston in a brake-actuating direction.
(e) means for moving the diaphragm in a braking direction;
(f) means for resiliently opposing movement of the piston in a braking direction and biasing the piston into a brake-releasing position;
(g) stop means for limiting the travel of the piston in a braking direction to limit the travel of the brake-actuating rod when moved by the piston;
(h) a push rod adapted to transmit braking movement to the brake-actuating rod through the diaphragm by moving into the recessed portion when the limit of piston travel is reached, thereby moving the brake-actuating rod relative to the piston;
(i) means for resiliently urging the push rod in a braking direction; and
(j) means for moving the push rod in a brake-releasing direction.

6. A brake-actuating mechanism according to claim 5 wherein the means for resiliently opposing movement of the piston in a braking direction and biasing the piston into a brake-releasing position is a helical spring disposed between the piston and the housing body, and wherein the piston travel in a braking direction is limited by the piston contacting the housing.

7. A brake-actuating mechanism according to claim 6 wherein fluid pressure is used to move the push rod in a brake-releasing direction.

8. A brake-actuating mechanism comprising:
(a) a first housing;
(b) a brake-actuating rod juxtaposed within the housing and movable in a braking direction, said brake-actuating rod having a radial flange formed thereon;
(c) a substantially disclike movable piston having a substantially concave recess in its central portion and an aperture in its center, the surface of the piston adjacent the aperture and opposite the substantially concave recess being adapted to contact the radial flange and move the brake-actuating rod in a braking direction;
(d) a movable diaphragm sealingly secured about its edge within and by the first housing and adapted to contact the surface portion of the piston adjacent the outer periphery of the piston and move the piston in a brake-actuating direction;
(e) a nut secured to the end of the brake-actuating rod through the aperture of the piston, the nut having a radial rib spaced from the surface of the substantially concave recess of the piston when the piston surface opposite the substantially concave recess is in contact with the radial flange of the brake-actuating rod thereby relatively movably mounting said rod with respect to said piston;
(f) means for transmitting fluid pressure against the diaphragm to move the diaphragm in a brake-actuating direction;
(g) a first helical spring disposed between the piston and the first housing body to resiliently oppose movement of the piston in a braking direction and bias the piston in a brake-releasing position, the piston travel in a braking direction being limited by the piston contacting the first housing;
(h) a second housing;
(i) a movable wall within the second housing;
(j) a push rod associated with the movable wall for transmitting braking movement to the brake-actuating rod through the diaphragm and the nut secured to the end of the brake-actuating rod;
(k) means for transmitting fluid pressure against the movable wall to move the push rod in a brake-releasing direction, and
(l) a second helical spring disposed between the second housing body and the movable wall to urge the push rod in a braking direction, the push rod being adapted to transmit force through the diaphragm to the nut secured to the end of the brake-actuating rod when the limit of piston travel is reached, thereby moving the brake-actuating rod relative to the piston until the radial rib of the nut contacts the substantially concave portion of the piston.

References Cited

UNITED STATES PATENTS

| | | | |
|---|---|---|---|
| 2,367,852 | 1/1945 | Eaton | 92—52 |
| 2,433,221 | 12/1947 | Huber | 92—101 X |
| 2,464,962 | 3/1949 | Bent | 92—52X |
| 2,936,785 | 5/1960 | Hastings | 92—63X |
| 3,107,583 | 10/1963 | Woodward | 92—63 |

MARTIN P. SCHWADRON, *Primary Examiner.*

IRWIN C. COHEN, *Assistant Examiner.*

U.S. Cl. X.R.

92—64, 101, 129